UNITED STATES PATENT OFFICE.

FRANCES MATILDA MOORE, OF CHICO, CALIFORNIA.

IMPROVEMENT IN MEDICAL COMPOUNDS FOR SORE THROAT, &c.

Specification forming part of Letters Patent No. 119,782, dated October 10, 1871.

*To all whom it may concern:*

Be it known that I, FRANCES MATILDA MOORE, of Chico, Butte county, State of California, have invented or discovered a new and Improved Medical Compound or Sirup; and I do hereby declare that the following is a full and exact description thereof, containing the names of the ingredients and the quantity of each employed, together with directions for using the same when compounded.

My invention relates to an improved medical compound or sirup for the cure of diphtheria, chronic inflammation of the tonsils, putrid sore throat, and, in fact, all throat diseases arising from the effects of a cold.

My compound consists of the following ingredients, viz.: distilled water, one (1) ounce; pulverized sugar, one (1) ounce; borax, twenty (20) grains; cayenne pepper, ten (10) grains; nutmeg, (grated,) five (5) grains; lemon, five (5) drops. These ingredients are all to be placed together in a vessel and boiled twelve (12) or fifteen (15) minutes, after which they are strained and the resulting liquor bottled for use.

This sirup can be used either as a lotion or gargle, or it can be taken internally, and will always give the best results in breaking the effects of recent or long-standing throat diseases.

Having thus described my invention, what I claim, and desire to secure by Letters Patent, is—

A medical compound or sirup composed of the ingredients named, mixed and prepared in about the manner specified, for the purpose above described.

In witness that the above-described invention is claimed by me I have hereunto set my hand and seal.

FRANCES MATILDA MOORE. [L. S.]

Witnesses:
   A. HALLET,
   P. E. PERKINS.

(98)